3,150,208
POLYESTERS CONTAINING TERMINALLY LOCATED PHOSPHONATE GROUPS AND RESINOUS COMPOSITIONS FORMED THEREFROM
Andrew Carson, Southampton, and Marvin J. Hurwitz, Elkins Park, Pa., assignors to Rohm & Haas Company, Philadelphia, Pa., a corporation of Delaware
No Drawing. Filed July 25, 1961, Ser. No. 126,533
15 Claims. (Cl. 260—862)

The present invention relates to polyesters containing $\alpha,\beta$-ethylenic unsaturation and having alkanephosphonate or arenephosphonate groups, at terminal locations only, as integral parts of the polyester molecule. It also relates to resinous compositions containing such polyesters and one or more copolymerizable monomeric compounds containing a $CH_2=C<$ group and products formed by curing such compositions. Methods of preparing the polyesters are also within the scope of this invention.

Products formed by curing these resinous compositions have a unique combination of properties that adapt them to a variety of uses, particularly in the reinforced plastics field. They are strong, rigid, hard and tough. In addition, they are flame-resistant and self-extinguishing. All of these properties are retained after prolonged exposure of such products to outside weather.

Phosphorus-containing compounds, such as phosphites, phosphates and phosphonates, when added to polyester compositions, are known to impart flame-retardant properties thereto. It has been found, however, that such compounds, in many instances, soften, weaken, and plasticize products formed when such compositions are cured. Furthermore, these compounds tend to migrate to the surface of such products and are leached therefrom by water. Thus, when the products are exposed to moisture, such as encountered when subjected to outside weather conditions, loss of flame-retardant properties occurs.

Polyester condensates having phosphonate groups in their molecular structure are also known. These known condensates are prepared by first reacting a phosphonic acid derivative, such as benzenephosphonic acid dichloride or cyclohexanephosphonic acid dimethyl ester, with a glycol and then esterifying the reaction mixture with a dicarboxylic acid or anhydride. The resulting condensates, when copolymerized with monomeric compounds containing a $CH_2=C<$ group, form products found to be deficient in strength, hardness, rigidity, and toughness. Upon exposure to moisture, these copolymeric products lose the flame-retardant properties which they initially display.

It has now been found that polyesters containing $\alpha,\beta$-ethylenic unsaturation and having alkanephosphonate or arenephosphonate groups as an integral part of the polyester molecule, at terminal locations only, have substantially enhanced properties over phosphorus-containing polyesters and phosphorus-containing polyester compositions heretofore known. Such polyesters are formed by first preparing a hydroxyl-terminated polyester having a molecular weight and an acid number within the ranges hereinafter specified and thereafter reacting the polyester with a dialkyl or diaryl alkane- or arene-phosphonate to replace hydroxyl groups with phosphonate groups.

Hydroxyl-terminated polyesters into which alkane- or arene-phosphonate groups are introduced in accordance herewith are prepared by reaction of a dihydric alcohol and an $\alpha,\beta$-ethylenically unsaturated dicarboxylic acid with a molar ratio of alcohol to acid greater than one until there results a polyester having a Gardner-Holdt solution (70% in styrene) viscosity of J to Z–1, preferably of P to Z, and more preferably of S to X, and an acid number of 0 to 5. A substantial molar excess of alcohol to acid, for instance of the order of 5 to 100%, may be used in the reaction if desired. This tends to hasten polyesterification. When such expedient is used the excess alcohol is recovered from the reaction mixture by distillation under reduced pressure at the completion of the reaction.

Examples of ethylenically unsaturated dicarboxylic acids used in the preparation of these polyesters are maleic, fumaric, citraconic, itaconic, and the like. These unsaturated acids should be present in an amount equal to at least 5% of the total weight of acids used, preferably in an amount of about 10% to 65% of the total weight of acids, the most preferred lower limit being 25% of the total weight of acids.

The condensates of dihydric alcohol and $\alpha,\beta$-unsaturated dicarboxylic acids may be modified with aromatic and saturated aliphatic polycarboxylic acids, such as phthalic, malonic, succinic, adipic, glutaric, sebacic, and the like.

When available, anhydrides of acids such as above noted may be used, for example, maleic anhydride and phthalic anhydride. The expression polycarboxylic acids as used herein includes such anhydrides. Also, mixtures of such acids and anhydrides may be used.

Examples of polyhydric alcohols which may be used in preparing the polyesters are ethylene glycol, diethylene glycol, 1,2-propylene glycol, propanediol-1,3, dipropylene glycol, butanediol-1,4, butanediol-1,3, butanediol-1,2, pentanediol-1,4, pentanediol-1,5, hexanediol-1,6, and the like. Alcohols containing two hydroxyl groups are preferred. However, alcohols having three or more hydroxyl groups, such as glycerol, pentaerythritol, dipentaerythritol, and the like may be used to replace minor amounts of dihydroxy alcohols.

The polyester having terminal hydroxyl groups is then reacted with a phosphonate by applying heat to the reaction mixture. The reaction is preferably carried out in the presence of a catalyst, such as dibutyltin oxide or lead oxide. The phosphonate is present in the reaction mixture in an amount sufficient to provide at least one mole of phosphonate for each equivalent of hydroxyl to be replaced in the polyester. An excess of phosphonate is ordinarily employed in this reaction. The resulting polyester contains phosphorus to the extent of 1 to 10% by weight and preferably 3 to 6%. It has an acid number within the range of 0 to 40, preferably 0 to 20, and still more preferably 0 to 10, and a Gardner-Holdt solution (70% in styrene) viscosity of J to Z–1, preferably P to Z, and more preferably of S to X.

Dialkyl or diaryl alkane- or arene-phosphonates of the following formula are used as one of the reactants in forming the polyesters of present concern:

where R and R' are selected from the class consisting of alkyl, alkenyl, aralkyl and alkaryl groups in which the number of aliphatic carbons contained therein is from one to four, and phenyl. These groups may also be substituted by halogen atoms and/or alkoxy groups containing one to four carbons in the alkyl portion and/or phenoxy groups. Typical thereof are dimethyl methanephosphonate, diethyl ethanephosphonate, diethyl methanephosphonate, dimethyl ethanephosphonate, dipropyl butanephosphonate, dimethyl phenylmethanephosphonate, diisobutyl benzenephosphonate, diphenyl benzenephosphonate, dimethyl methoxymethanephosphonate, diethyl chloromethanephosphonate, diisopropyl ethanephosphonate, dimethyl 2-propenephosphonate, diisopropyl p-toluenephosphonate, and the like. Hereinafter, all compounds which come under the above definition will be referred to simply as "phosphonates." These compounds and method of preparing them are well known in the art.

In forming resinous compositions, the novel polyesters may be admixed with any of the monomeric compounds containing a polymerizable $CH_2=C<$ group recognized in the art as a suitable cross-linking agent for polyesters generally in the ratios taught by such art. These monomeric compounds have a boiling point of at least 60° C. Typical of such monomeric compounds are styrene, side-chain and ring alkyl and halo-substituted styrenes, such as o-, m- and p-methylstyrenes, alpha-methylstyrene, 2,4-dimethylstyrene, 2,3-dimethylstyrene, 2,5-dimethylstyrene, alpha-chlorostyrene, alpha-ethylstyrene, p-ethylstyrene, n-propylstyrene, bromostyrene, dichlorostyrene, isopropenyltoluene, vinylnaphthalene, and the o-, m- and p-chlorostyrenes and bromostyrenes; esters of alpha-methylene aliphatic monocarboxylic acids, such as methyl acrylate, ethyl acrylate, n-butyl acrylate, isobutyl acrylate, dodecyl acrylate, 2-chloroethyl acrylate, 2-chloropropyl acrylate, 2,2'-dichloroisopropyl acrylate, phenyl acrylate, cyclohexyl acrylate, methyl alpha-chloroacrylate, methyl methacrylate, ethyl methacrylate, methyl ethacrylate; acrylonitrile, methacrylonitrile; vinyl esters, such as vinyl acetate, vinyl chloroacetate, vinyl propionate, vinyl butyrate, vinyl laurate, vinyl stearate; vinyl ethers, such as vinyl methyl ether, vinyl isobutyl ether, vinyl 2-chlorethyl ether; vinyl ketones, such as vinyl methyl ketone, vinyl hexyl ketone, methyl isopropenyl ketone; isobutylene; vinylidene halides, such as vinylidene chloride, vinylidene chlorofluoride; N-vinyl compounds such as N-vinylpyrrole, N-vinylcarbazole, N-vinylindole, N-vinylsuccinimide; acrolein, methacrolein, acrylamide, methacrylamide, N-methylolacrylamide; and allyl compounds, such as diallyl phthalate, tetrachlorodiallyl phthalate, allyl alcohol, methallyl alcohol, allyl acetate, allyl methacrylate, diallyl carbonate, allyl lactate, allyl alphahydroxyisobutyrate, allyl trichlorosilane, allyl acrylate, diallyl malonate, diallyl oxalate, diallyl gluconate, diallyl methylgluconate, diallyl adipate, diallyl sebacate, diallyl citroconate, the diallyl ester of muconic acid, diallyl itaconate, diallyl chlorophthalate, diallyldichlorosilane, the diallyl ester of endomethylene tetrahydrophthalic anhydride, triallyl tricarballylate, triallyl aconitate, triallyl citrate, triallyl cyanurate, triallyl phosphate, trimethallyl phosphate, tetraallylsilane, tetraallyl silicate, hexallyldisiloxane, and the like.

It is not uncommon to use about 10 to 50 parts by weight of the monomeric compound to about 90 to 50 parts by weight of polyester. In a preferred embodiment about 25 parts to 40 parts by weight of the former are used with about 75 parts to 60 parts by weight of the latter.

Additives which are conventional in the prior polyester resin art may be used in the novel compositions herein set forth. Such additives include catalysts for curing; promoters for use in conjunction with catalysts for curing at room or lower temperature; mold lubricants; fillers and reinforcements, such as asbestos and glass fibers; inhibitors, such as hydroquinone, to stabilize the mixture against premature gelation; colorants, such as compatible dyes and pigments; and plasticizers. Curing of any of the new liquid resin compositions may be accomplished with or without added pressure, in the atmosphere or in closed molds at temperatures ranging from about 10° C. up to 150° C. or even higher temperatures as long as they are kept below the point at which resin degradation commences. Where convenient, it is usually desirable to form the copolymers by heating the catalyzed resin-forming mass to about 90° to 120° C., for a period of about 10 to 90 minutes.

To illustrate the invention more fully, the following examples are given wherein the parts specified are by weight:

EXAMPLE 1

(a) A mixture of 868 parts (14 mols) of ethylene glycol, 768 parts (5.2 mols) of phthalic anhydride and 588 parts (6 mols) of maleic anhydride was stirred and gradually heated until a temperature of 190–200° C. was reached. The mixture was heated at this temperature until it attained an acid number of 3.5. The resulting polyester was then inhibited with 0.01% hydroquinone. A viscosity of V was observed on the Gardner-Holdt scale at 25° C. when 70 parts of the polyester was dissolved in 30 parts of ethylene dichloride.

(b) 703 parts of the polyester resulting from (a) above, 325 parts (1.96 mols) of diethyl ethanephosphonate, and two parts of dibutyltin oxide were heated and agitated at 190–200° C. until 45 parts of a distillate had been removed. The reaction mixture was then cooled and a vacuum of 4 mm. applied. The mixture, while under vacuum, was heated until a temperature of 190–200° C. was reached. During this time, 106 parts of distillate was removed. Upon cooling there resulted a viscous polyester, which was found to have a phosphorus content of 4.7% and an acid number of 15.

(c) Seventy parts of the polyester prepared as last above indicated was dissolved in 30 parts of styrene. There resulted a solution having a viscosity of P–Q on the Gardner-Holdt scale at 25° C. A casting was prepared from this composition by adding thereto 1% benzoyl peroxide as a catalyst, pouring it into a glass mold ⅛ inch thick and applying heat at a temperature of 60–120° C. for 15 hours. There resulted a hard, clear, insoluble, infusible resin, a sample of which upon being soaked in water for seven days at 23° C. did not lose any weight. Furthermore, a sample soaked in water for two hours at 100° C. likewise did not lose any weight.

EXAMPLE 2

510 parts of a polyester prepared as indicated in part (a) of Example 1, 118.5 parts (0.96 mol) of dimethyl methanephosphonate, and 1.3 parts of lead oxide were heated and agitated at 190–200° C. for 17 hours. Thirty parts of a distillate was removed during the reaction. A vacuum of 2 mm. was applied and, while the temperature of the charge was maintained at 190–200° C., an additional 10 parts of distillate was removed. Upon cooling the polyester formed was found to have a phosphorus content of 4.4% and an acid number of 6.

Seventy parts of the resulting polyester was dissolved in a monomeric mixture of 15 parts of styrene and 15 parts of methyl methacrylate to form a solution having a viscosity of Q on the Gardner-Holdt scale at 25° C. A casting was prepared from this solution following the procedure indicated in Example 1(c) above.

The resin had an initial Barcol Hardness of 46. After being soaked in water at 23° C. for seven days its Barcol Hardness was 38. Other physical properties of this resin are given in the tables appearing below.

EXAMPLE 3

288 parts of polyester prepared in accordance with Example 1(a) above, 409 parts (1.32 mols) of dibutyl butanephosphonate, and 1.4 parts of dibutyltin oxide were reacted in the manner indicated in Example 1(b) above. The resulting viscous polyester was found to have a phosphorus content of 3.9% and an acid number of 20.

Seventy parts of the resulting polyester was blended with 30 parts of methyl methacrylate monomer to provide a solution having a viscosity of Q on the Gardner-Holdt scale at 25° C. A casting was prepared from this solution following the procedure of Example 1(c) above. This casting was hard, clear, and infusible. It showed no loss in weight after being soaked for seven days in water at 23° C. A sample soaked in water for two hours at 100° C. likewise showed no loss in weight.

EXAMPLE 4

(a) A mixture of 868 parts (14 mols) of ethylene glycol, 1064 parts (14 mols) of propylene glycol, 151 parts (1.25 mols) of trimethylolethane, 1212 parts (8.2 mols) of phthalic anhydride, and 1215 parts (12.4 mols) of maleic anhydride was stirred and gradually heated until a temperature of 190°–200° C. was reached. The mixture was heated at this temperature until it reached an acid number of 3.0. Mineral spirits, 160 parts, was added together with eight parts of litharge. Heating at 180–200° C. was continued until 300 parts of an ethylene glycol-propylene glycol mixture was recovered. The glycol separated as a lower phase from the condensed hydrocarbon solvent and was drawn off. The solvent was recirculated to the reaction flask. Vacuum was finally applied to the polyester to remove the inert solvent and the polyester was inhibited with 0.01% hydroquinone. The polyester so produced was found to have a viscosity of Z–4 on the Gardner-Holdt scale for a sample of the resin dissolved in ethylene dichloride in the proportion of 70 parts of the condensate and 30 parts of ethylene dichloride. The final acid number of the polyester was 0.3.

(b) 549 parts of a polyester prepared as indicated in Example 4(a) above and 195 parts (1.57 mols) of dimethyl methanephosphonate were agitated and heated at 190–200° C. under 400 mm. pressure until 35 parts of a distillate had been removed. After the reaction mixture had cooled, a vacuum of 2–4 mm. was applied. Thereafter, the mixture was heated until a temperature close to 190–200° C. was reached and 34 parts of a distillate was removed. The resulting viscous polyester was found to have a phosphorus content of 4.9% and an acid number of 14.

Seventy parts of the polyester was blended with 30 parts of styrene to provide a solution having a viscosity of V–W on the Gardner-Holdt scale at 25° C. A casting was prepared therefrom in the manner indicated in Example 1(c). The physical properties of the cast polymer are given in the tables appearing below.

In order to compare the properties of products produced in accordance herewith, as given in the above examples, with those of condensates prepared by first reacting a phosphonic acid derivative, such as phenylphosphonic acid dichloride or cyclohexanephosphonic acid dimethyl ester, with a glycol and then esterifying the reaction mixture with dicarboxylic acids or anhydrides, condensates of the type last mentioned were prepared as follows:

EXAMPLE 5

A mixture of 434 parts (7 mols) of ethylene glycol, 269 parts (2.75 mols) of maleic anhydride, 444 parts (3 mols) of phthalic anhydride, 332 parts (2 mols) of diethyl ethane phosphonate, and 3 parts of dibutyltin oxide was stirred, gradually heated to 200° C., and maintained at that temperature in a distillation flask for 20 hours. To insure the removal of any unreacted phosphonate the mixture was cooled under a reduced pressure of 2 mm. until a temperature of 185° C. was reached. The resulting polyester was found to have an acid number of 132 and a phosphorus content of 5.0%. It was inhibited with 0.01% of hydroquinone and blended with styrene in the proportions of 70 parts polyester to 30 parts styrene. The solution had a viscosity of G on the Gardner-Holdt scale at 25° C. To the solution there was added 1% benzoyl peroxide and a casting was prepared therefrom following the procedure indicated in Example 1(c) above. A hard, clear, insoluble resin resulted having physical properties as given in the tables below.

EXAMPLE 6

Example 5 was followed except that 296 parts (2 mols) of ethanephosphonyl dichloride was substituted for the diethyl ethanephosphonate used therein. The acid number of the resulting polyester was found to be 164 and a phosphorus content of 5.1%.

A solution of 70 parts of the polyester in 30 parts of styrene gave a solution having a viscosity of P on the Gardner-Holdt scale at 25° C. A casting was prepared from the solution following the procedure of Example 1(c). The physical properties of cast polyester are indicated in the tables below.

In order to compare the properties of products produced in accordance with this invention with compositions wherein the phosphonate is physically admixed with the polyester and polymerizable monomer, there was carried out the following example.

EXAMPLE 7

Seven hundred seventy-three parts (12.5 mols) of ethylene glycol, 935 parts (6.3 mols) of phthalic anhydride, and 541 parts (5.5 mols) of maleic anhydride were reacted to an acid number of 46 under substantially the same conditions described in Example 2. The resulting polyester was blended with styrene and diethyl ethanephosphonate in the proportions of 54 parts of resin, 16 parts of diethyl ethanephosphonate, and 30 parts of styrene to give a solution having a phosphorus content of 3.0%. The composition was cast in a manner analogous to that of Example 1(c). The Barcol Hardness of the casting was found to be zero. Other physical properties thereof are given in the tables below.

*Table I*

| Composition | Mechanical properties | |
|---|---|---|
| | Flexural modules (p.s.i. × 10⁻⁶) | Flexural strength (p.s.i.) |
| Example 2 | 0.60 | 20,500 |
| Example 4 | 0.57 | 18,400 |
| Example 5 | 0.23 | 8,500 |
| Example 6 | 0.35 | 9,600 |
| Example 7 | 0.05 | 1,000 |

*Table II*

| Composition | Water extractibility | |
|---|---|---|
| | Percent solubles after 7 day soak at 23° C. | Percent solubles after 2 hr. soak at 100° C. |
| Example 2 | 0.0 | 0.0 |
| Example 4 | 0.0 | 0.0 |
| Example 5 | 0.4 | 1.2 |
| Example 6 | 0.6 | 3.1 |
| Example 7 | 1.8 | 10.0 |

*Table III*

| Composition | Flame-resistance | | |
|---|---|---|---|
| | "Globar" test (ASTM, D–757–49), inches/minute | "Bunsen" test (ASTM, D–635–44) | |
| | | Unexposed | After water exposure, 2 hours at 100° C. |
| Example 2 | 0.15 | Self-extinguishing | Self-extinguishing. |
| Example 4 | 0.31 | do | Do. |
| Example 5 | 0.31 | do | Flammable. |
| Example 6 | 0.36 | do | Do. |
| Example 7 | 0.45 | do | Do. |

As will be noted from the tables given above, the physical properties of castings prepared from unsaturated polyesters within the scope of this invention are substantially improved over those prepared from unsaturated polyesters wherein phosphonate groups are randomly distributed in the polyester molecule as well as unsaturated polyester compositions containing a phosphonate in physical admixture with the polyester.

We claim:
1. A polyester comprising a polymeric condensation product of a polyhydric alcohol and α,β-ethylenically unsaturated polycarboxylic acid, having attached at terminal locations only a phosphonate group of the formula $$-O\underset{\underset{R'}{|}}{\overset{\overset{O}{\|}}{P}}OR$$

wherein R and R' are each selected from the class consisting of phenyl, alkyl, alkenyl, aralkyl, and alkaryl groups in which the number of aliphatic carbon atoms is one to four, the polyester having a phosphorus content of from 1 to 10% by weight.

2. A polyester as defined in claim 1 wherein R is an alkyl group of one to four carbon atoms.

3. A polyester as defined in claim 1 wherein R' is an alkyl group of one to four carbon atoms.

4. A polyester as defined in claim 1 wherein R and R' are each alkyl groups of one to four carbon atoms.

5. A polyester as defined in claim 1 wherein R and R' are methyl groups.

6. A polyester as defined in claim 1 wherein R and R' are ethyl groups.

7. A method for preparing a polyester which comprises reacting a polycarboxylic acid containing α,β-ethylenic unsaturation with a molar excess of a polyhydric alcohol until an acid number within the range of 0 to about 5 is reached and thereafter reacting by condensing the resulting hydroxyl-terminated polyester with a phosphonate of the formula $$RO\underset{\underset{R'}{|}}{\overset{\overset{O}{\|}}{P}}OR$$

wherein R and R' are each selected from the class consisting of phenyl, alkyl, alkenyl, aralkyl, and alkaryl groups in which the number of aliphatic carbon atoms is one to four.

8. A method as set forth in claim 7 wherein the phosphonate used is dimethyl methanephosphonate.

9. A method as set forth in claim 7 wherein the phosphonate used is diethyl ethanephosphonate.

10. A composition of matter which comprises (a) a polymerizable polyester containing ethylenic unsaturation and having attached, at a terminal location only, a phosphonate group of the formula $$-O\underset{\underset{R'}{|}}{\overset{\overset{O}{\|}}{P}}OR$$

wherein R and R' are each selected from the class consisting of phenyl, alkyl, alkenyl, aralkyl, and alkaryl groups, in which the number of aliphatic carbon atoms is one to four, and (b) a compound containing a polymerizable $CH_2=C<$ group and having a boiling point of at least 60° C.

11. A composition of matter as defined in claim 10 wherein (b) is styrene.

12. A composition of matter as defined in claim 10 wherein (b) is methyl methacrylate.

13. A composition of matter as defined in claim 10 wherein (b) is vinyltoluene.

14. A composition of matter as defined in claim 10 wherein (b) is a mixture of styrene and methyl methacrylate.

15. A polyester as in claim 1 wherein the phosphorus content of the polyester is within the range of from 3 to 6% by weight.

References Cited in the file of this patent
UNITED STATES PATENTS

| | | |
|---|---|---|
| 2,824,085 | Cummings | Feb. 18, 1958 |
| 2,877,204 | Duhnkrack et al. | Mar. 10, 1959 |
| 3,052,653 | Iannicelli | Sept. 4, 1962 |
| 3,058,935 | Starck | Oct. 16, 1962 |

FOREIGN PATENTS

| | | |
|---|---|---|
| 590,978 | Canada | Jan. 19, 1960 |